D. ALEXANDER.
DIRECTION INDICATOR.
APPLICATION FILED SEPT. 27, 1919.
1,333,365.
Patented Mar. 9, 1920.
2 SHEETS—SHEET 1.
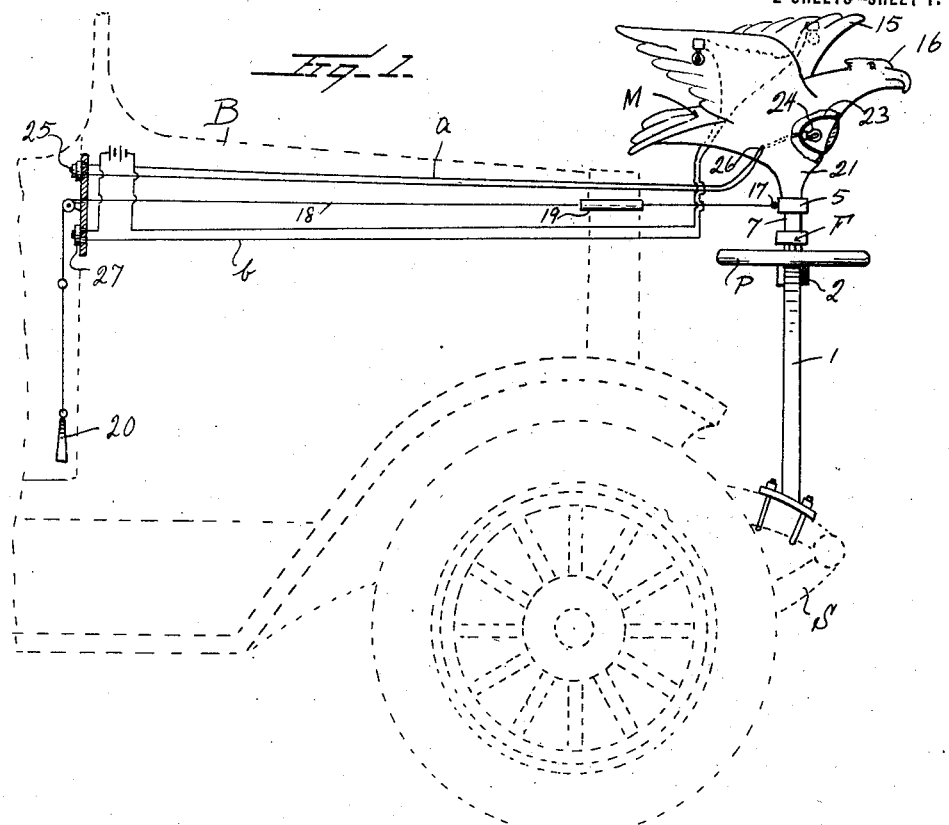
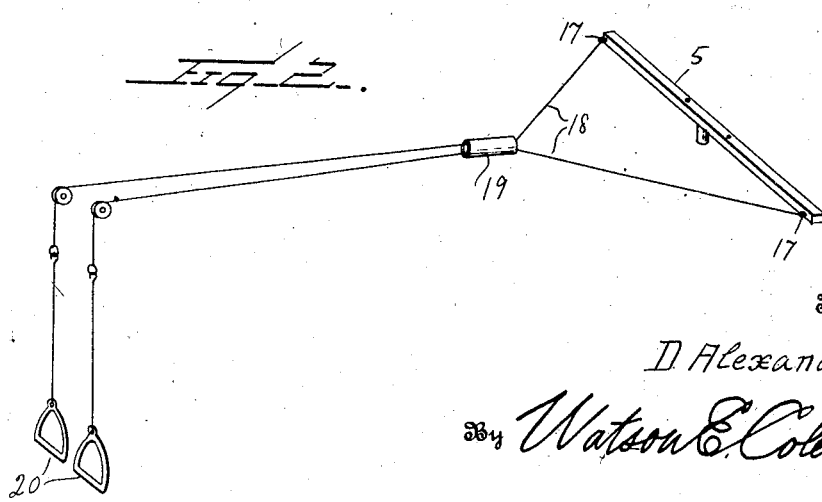
Inventor
D Alexander
By Watson E. Coleman
Attorney

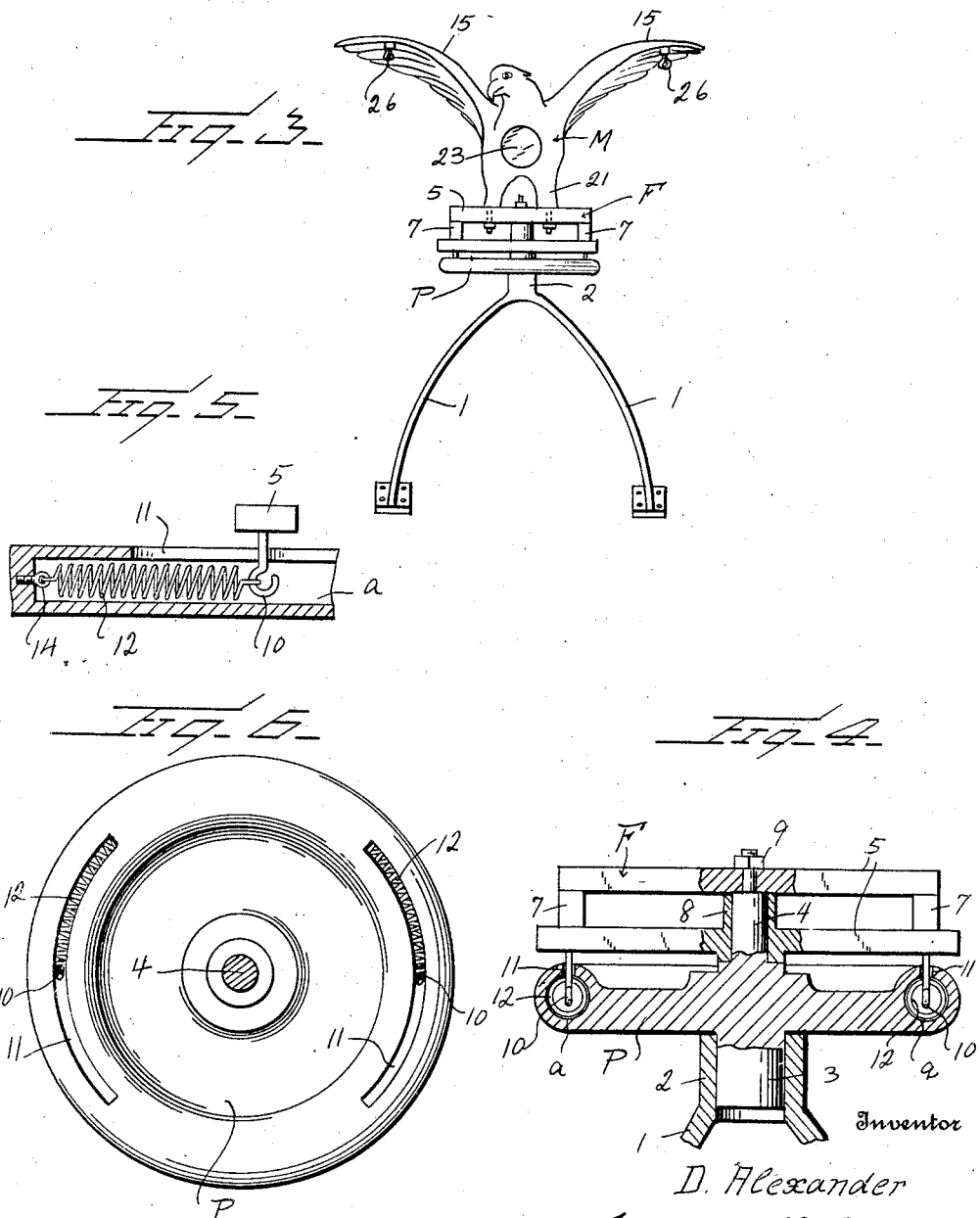

UNITED STATES PATENT OFFICE.

DAVID ALEXANDER, OF CHICAGO, ILLINOIS.

DIRECTION-INDICATOR.

1,333,365.  Specification of Letters Patent.  Patented Mar. 9, 1920.

Application filed September 27, 1919. Serial No. 326,968.

*To all whom it may concern:*

Be it known that I, DAVID ALEXANDER, a citizen of the United States, residing at Chicago, in the county of Cook and State of Illinois, have invented certain new and useful Improvements in Direction-Indicators, of which the following is a specification, reference being had to the accompanying drawings.

This invention relates to certain improvements in direction indicators and has relation more particularly to a device of this general character especially designed and adapted for use in connection with motor-driven vehicles and the like, and it is an object of the invention to provide a novel and improved device of this general character including a body or member supported by the forward portion of the vehicle for movement about a vertical axis together with means operated by the driver or other occupant of the vehicle for imparting the desired swinging movement to the body or member.

It is also an object of the invention to provide a novel and improved device of this general character provided with suitably positioned lamps whereby the device may be employed with convenience and facility after nightfall.

It is also an object of the invention to provide a novel and improved device of this general character which also serves as a headlight, in order to facilitate the illumination of the rod away in advance of the vehicle.

The invention consists in the details of construction and in the combination and arrangement of the several parts of my improved direction indicators whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section illustrating an indicator constructed in accordance with an embodiment of my invention, the coacting portion of the vehicle being indicated by dotted lines;

Fig. 2 is a diagrammatic view illustrating the general arrangement of the device as herein embodied;

Fig. 3 is a view in front elevation of the portion of the device which is supported by the front springs of the vehicle;

Fig. 4 is an enlarged fragmentary view partly in elevation and partly in section, illustrating the mounting of the frame and the plate with which it coacts;

Fig. 5 is an enlarged fragmentary view illustrating the mounting of a retractile member coacting with the frame, and, Fig. 6 is a view partly in top plan and partly in section illustrating the plate with which the frame coacts.

As disclosed in the accompanying drawings, B denotes the forward end portion of the body of a motor-driven vehicle which is mounted upon the supporting spring S of a conventional type, and which springs extend a distance in advance of the body B.

Clamped or otherwise secured to the extended portion of the springs S are the lower or free end portions of the upstanding arms 1. The arms 1 are disposed upwardly on a predetermined inward incline, and have the upper extremity integrally connected with a vertically disposed sleeve or bushing 2.

P denotes a circular plate or disk provided at its axial center with a depending lug or boss 3 seating within and suitably held by the sleeve or barrel 2. The plate P is substantially horizontally arranged, and is provided at its axial center with an upstanding post 4, and which serves as a pocket or mounting for the frame F.

The frame F comprises two vertically spaced elongated members 5 arranged in parallelism and connected at the outer extremities by the arms 7. The center portions of the members 6 are also connected by the tubular standard 8 through which the post 4 is disposed. The post 4 is of a length to extend above the standard 8, so that a retaining nut 9 or the like may be engaged therewith to hold the frame F against displacement.

Depending from the opposite end portions of the lower member 5 are the hook members 10, which extend within the diametrically opposed arcuate grooves or channels 11 provided in the upper face of the plate P adjacent the periphery thereof. The lower or base portion a of each groove or channel 11 is enlarged, as is clearly indicated in the accompanying drawings.

Arranged within the base portions a of the grooves or channels 11 and at substantially diametrically disposed points are the retractile members 12, preferably coil springs, and said members have similar ends anchored, as at 14, within the grooves or channels 11 and the opposite end portion of each of said members 12 engaged with a hook member 10. By this means the members 12 serve to normally maintain the frame F in a straight ahead position, or in a position substantially at right angles to the longitudinal center of the body B, but at the same time permits said frame to have a limited swinging movement in either direction.

M denotes a member preferably in simulation of an American eagle with the wings 15 outspread, as in flight. The head 16 serves as a pointer and operates, particularly in daylight, to give indication in which direction a turn is to be made, or that the vehicle is to continue travel straight ahead. When a turn is to be made to either the right or the left, the occupant of the vehicle imparts the requisite swinging movement to the member M at a desired distance ahead of the place of turning such as an intersection of streets.

The upper member 5 at its opposite ends is provided with the eye members 17 or the like, with which are engaged the flexible members 18. The members 18 are disposed rearwardly and also through the tubular member or nipple 19, disposed through the upper part of the forward end or radiator of the body B.

My improved indicator is particularly adapted for use in connection with automobiles, and when so used the flexible members 18 extend rearwardly of the body B within the hood, and each of said members extends through the rear of the body and terminates in a depending portion provided at its lower end with a stirrup 20, so that requisite pull may be imposed upon said flexible members 18 by a foot of the driver of the vehicle, so that it is not necessary for the driver to remove his or her hands from the steering wheel. It will be obvious, however, that the driver or other occupant of the car may impose pull upon a member 18 by directly engaging the same with a hand.

The member M is provided with depending legs 21 bolted or otherwise secured to the upper member 5 of the frame F.

The breast portion of the member M is provided with a pocket 22 having its outer end inclosed by a bushing or other means 23 and arranged within the pocket 22 is a lamp 24 of any desired type, but preferably electric. This lamp 24 is in connection with a suitable source of electrical energy through the conductors a, and interposed in one of such conductors is a switch 25, preferably carried by the dash of the body B, so that the operation of the lamp L can be readily and conveniently controlled. The conductors a, preferably enter within the member M through a side thereof, as indicated at 26.

Carried by the opposed or outer end portions of the wings 15 are the lamps 26 in electrical connection through the medium of the conductors b with a suitable source of electrical energy, and said lamps may be either in series or in parallel, as the requirements of practice demand. Interposed in one of the conductors b is a switch 27, so that the operation of the lamps 26 can be readily controlled.

The lamps 26 are adapted to be illuminated after nightfall, so that when the body M is swung to one side or to the other visual indication will be given that the vehicle is to make a turn in a certain direction. It is preferred that the lamps 26 be capable of ready removal in the day time, or when not in use, they may be stored in the body B or other location, in order to prevent the same from becoming broken.

From the foregoing description, it is thought to be obvious that a direction indicator constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a vehicle body and supporting springs for the forward end portion thereof, an upstanding supporting structure secured to said springs, a substantially horizontally disposed plate carried by the upper portion of the structure and provided with substantially diametrically opposed grooves, a frame rotatably supported by the plate and provided with parts extending within the grooves, retractile members within the grooves and engaging the parts of the frame extending within the grooves for normally maintaining the frame in a predetermined position, independently operable means engaged with the opposite end portions of the frame for imparting movement thereto, and an indicating member carried by the frame.

2. A direction indicator for a vehicle comprising a supporting structure adapted to be secured to the vehicle and including a substantially horizontally disposed plate, the upper surface of the plate being provided with diametrically opposed arcuate channels, the central portion of the plate being provided with an upstanding post, a member having its central portion rotatably engaged with said post and provided at its opposite end portions with depending parts extending within the grooves, coil springs mounted within the grooves and engaged with said parts for normally maintaining the member in a predetermined position, and an indicating member carried by said first-named member.

In testimony whereof I hereunto affix my signature.

DAVID ALEXANDER.